L. J. HOLT.
CLUTCH.
APPLICATION FILED DEC. 7, 1911.
1,122,502.
Patented Dec. 29, 1914.
2 SHEETS—SHEET 1.
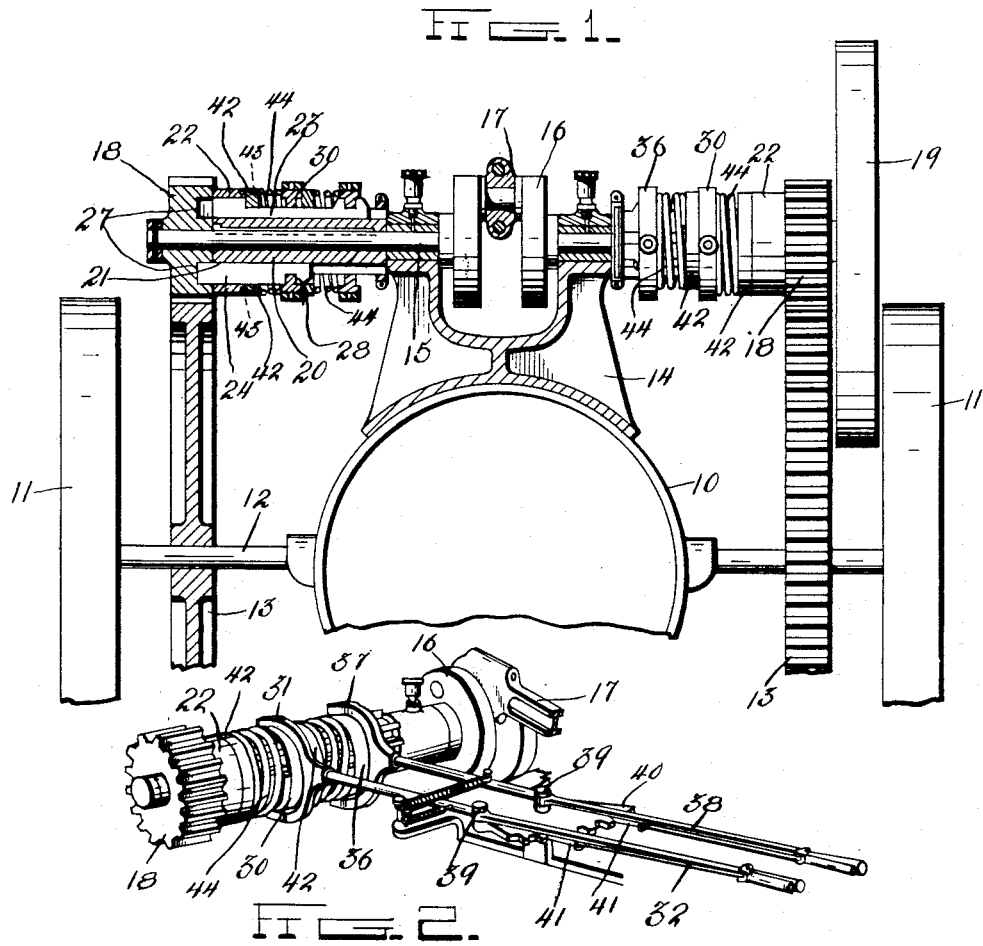
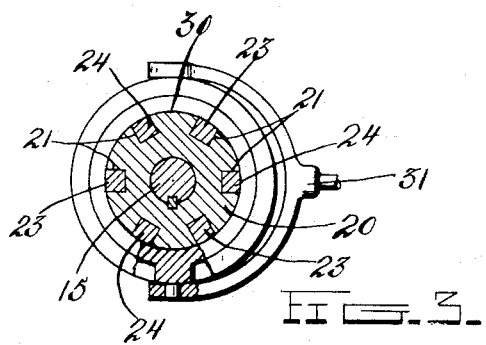
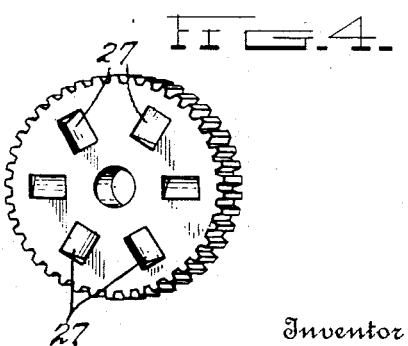
Witnesses
Inventor
L. J. Holt.
By
Attorneys

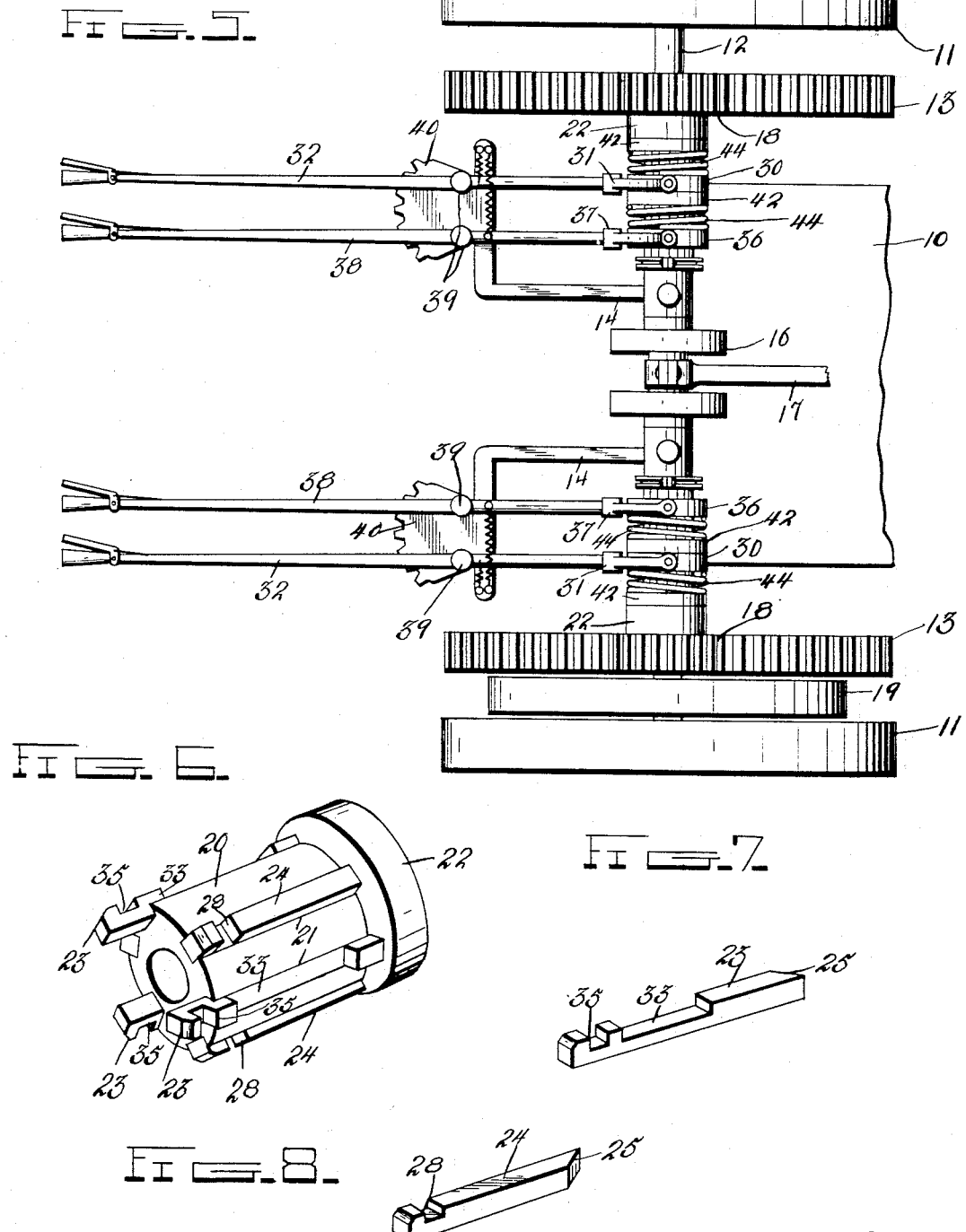

UNITED STATES PATENT OFFICE.

LEVI J. HOLT, OF GLAZIER, TEXAS.

CLUTCH.

1,122,502.  Specification of Letters Patent.  Patented Dec. 29, 1914.

Application filed December 7, 1911. Serial No. 664,386.

*To all whom it may concern:*

Be it known that I, LEVI J. HOLT, a citizen of the United States, residing at Glazier, in the county of Hemphill, State of Texas, have invented certain new and useful Improvements in Clutches; and I do hereby declare the following to be a full, clear, and exact description of the invention, such as will enable others skilled in the art to which it appertains to make and use the same.

This invention relates to new and useful improvements in clutches and more particularly to that class adapted to be used upon traction vehicles.

An object of this invention is the provision of a clutch in which there are arranged independent series of locking pins slidably fitted in a sleeve fixed upon a rotatable crank shaft, the independent series of pins being controlled by a manually operated pair of throw levers whereby they may be moved into locking engagement with a loose gear to hold the same fast with a sleeve, thereby causing its rotation in the same direction as the fixed sleeve for the purpose of either propelling a vehicle in a forward or in a reversed direction.

Another object of this invention is the provision of a clutch of this character in which either of the traction wheels of the vehicle may be thrown out of operative engagement with the driving gears to permit the said vehicle to turn corners.

A further object of this invention is to improve and simplify devices of this character rendering them comparatively simple and inexpensive to manufacture, reliable and efficient in use and readily operated.

With the above and other objects in view this invention resides in the novel features of construction, formations, combinations and arrangements of parts to be hereinafter more fully described, claimed and illustrated in the accompanying drawings, in which:—

Figure 1 is a fragmentary vertical transverse sectional view taken through the rear portion of a traction engine showing my invention applied thereto and partly in section. Fig. 2 is a fragmentary perspective view illustrating one of the clutch devices. Fig. 3 is a transverse sectional view taken on the line 3—3 of Fig. 1. Fig. 4 is a detailed perspective view of one of the loose gears. Fig. 5 is a top plan view of a portion of a traction engine having my invention applied thereto. Fig. 6 is a detailed perspective view of one of the fixed sleeves with the locking pins mounted thereon. Fig. 7 is a detailed view of the reversed locking pin, and Fig. 8 is a detailed perspective view of the other locking pin.

Referring to the drawings by similar characters of reference throughout the several views, the numeral 10 designates a portion of the rear end of a traction engine which is of any ordinary well known type, having the usual traction wheels 11, mounted upon the ends of an axle 12, the same being rotated by gear wheels 13, keyed thereon and arranged at the opposite sides of the body of the traction engine.

Superimposed upon the body of the traction engine and rising vertically therefrom is a casing forming a bracket 14, in which is journaled a driven shaft 15 provided with a central crank 16, to which is loosely connected one end of a pitman 17 which is actuated by a suitable motor or engine not shown in the drawings and adapted to be mounted at any convenient location upon the said traction engine.

Gear wheels 18 are mounted loosely upon opposite ends of the driven shaft 15 to mesh with the before mentioned gear wheels 13 whereby motion from the driven shaft will be imparted to the axle for the purpose of driving the traction wheels. This shaft 15 has also fixed thereto a fly wheel 19 of the usual type, to cause the even rotary movement of the said shaft.

Arranged at opposite sides of the bearing bracket 14, and surrounding the shaft 15, are hubs 20, the latter being splined to the driven shaft. Each of the said hubs 20 is provided in its outer face with guide channels or grooves 21 which extend in spaced parallel relation to each other longitudinally of the hub. One end of each hub is provided with an annular clutch head 22 containing suitable openings registering with the guide grooves or channels 21, the channels or grooves being fitted with independent series of locking pins 23 and 24, mounted for sliding movement in the said guide grooves for movement through the openings in the clutch head 22 whereby one end of each pin of any one series will protrude beyond the outer face of the clutch head for a purpose to be hereinafter more fully described.

One end of each pin is beveled to form a ratchet extremity 25 and the pins 23 are greater in length than the pins 24, the said ratchet extremities 25 being reversely arranged with respect to each other and are adapted to engage a circular groove from which extend recesses correspondingly to the beveled ends, which recesses 27 produce upon the inner faces of the gear wheels 18 clutch faces so that upon the insertion of the locking pins 23 in the recesses 27 the gear wheels 18 will be rotatably connected to the shaft 15 to drive the traction wheels positively in the same direction. Manifestly upon the release of the locking pins from the recesses 27 and the movement of the locking pins 24 into engagement with the said recesses a connection between the gear wheels 28 and the shaft 15 will be effected producing a reverse rotary movement of the traction wheels upon the reverse movement of the drive shaft.

The locking pins 24, are provided with alining notches 28 engaged by a collar 30 which latter is pivotally mounted in the forked end 31 of a manually operated throw lever 32, so that upon the shifting of this lever the series of pins 24 will be moved in unison either for engagement with or disengagement from the clutch faces of the gear wheels 18. The locking pins 23 are cut to form elongated recesses 33 which permit the movement of the pins 24 independently of the pins 23 as the collar 30 traverses in the said recesses 33 when the locking pins 24 are shifted in reversing the drive. The locking pins 23 are also provided with notches 35 in which is slidably engaged a collar 36, the latter being pivotally mounted between the forked end 27 of a throw lever 38, so that the pins 23 may be shifted into locking or unlocking position for engagement or disengagement from the gear wheels 18 on the shifting of the throw lever 38. These throw levers 32 and 38 are pivotally mounted as at 39 upon toothed segments suitably fixed at a convenient location upon the body of a traction engine. The throw levers 32 and 38 are provided with hand released locking pawls 41, the same being normally engaged with the toothed segments 40 to maintain the said levers in their adjusted position.

Collars 42 are adjustably secured to the hubs 20 and are held against any undesired longitudinal movement thereon by suitable set screws or other suitable fastening devices 43. Tension springs 44 are interposed between the said collars 42 and the adjacent ends of the collars 30 and 36 and serve to automatically operate the pins upon the release of the levers 32 and 37 from the segments 40 by means of the pawls 41 and the hand releasing means.

From the foregoing disclosures it will be seen that a clutch mechanism for traction engines or the like is provided for which will fulfil all of the necessary requirements of such a device.

From the above description, taken in connection with the accompanying drawings, the construction and manner of operating my invention will be readily apparent. Assuming the gear 18 to be loose on the shaft 15, if it be desired to place the gear in driving engagement with the shaft so that the gear wheel 13 will be driven and consequently the machine propelled ahead it is only necessary for the operator to release the locking pawl of the lever 32 and throw said lever to shift the collar 30 against the tension of the spring 44, this shifting of the collar causing the pins 23 to be moved laterally outward so that the beveled ends thereof seat in the correspondingly beveled recess in the gear 18, and such gear is thereby connected with the shaft 15. The lever may then be locked by means of the locking pawl and the pins will be held in engaging position with the gear wheel 18, and consequently the latter will rotate with the shaft. If it is desired to withdraw the pins 23 from the recess of the gear wheel 18, the locking pawl of the lever 32 is released and the tension spring 44 will instantly push the collar 30 and the pins in toward the center of the engine and consequently disengage the ends of the pins from the recesses of the gear wheel 18. Likewise if it is desired to place the gear wheel 18 in driving engagement with the shaft for reversing the machine, the locking pawl of the lever 38 is released and this lever is then thrown to shift the collar 36 outward and consequently to slide the locking pins 24 so that the beveled ends of said pins will enter the correspondingly beveled recesses of the gear wheel 18 and place said gear wheel in reverse driving relation with the shaft 15.

When it is desired to disconnect the pins 24 from the gear wheel 18, the locking dog is released and the spring bearing against the collar 36 will shift the latter inward toward the center of the machine and consequently cause the withdrawal of the ends of the pins 24 from their recesses in the gear wheel 18. Thus it will be noted that the pins 23 are engaged with the gear wheel 18 for direct drive, while the pins 24 are engaged with this gear wheel 18 for the reverse drive.

Having thus particularly described this invention, what I claim as new and desire to protect by Letters Patent, is:—

1. The combination with a driven shaft, of a sleeve fixed on the shaft, a gear loose on the shaft and provided with two sets of beveled recesses the inclinations of the sides of one set of recesses being reversed with respect to the inclinations of the sides of the other set of recesses, two independent sets of locking pins slidably fitted in the sleeve, each set of pins having beveled ends to correspond to the recesses of the gear with which they are adapted to engage, an operating lever for moving one set of pins into engagement with one set of recesses for the rotation of the gear in one direction, and a second operating lever for shifting the other set of pins into engagement with the other set of recesses for rotation of the gear in the opposite direction.

2. The combination with a driven shaft, of a power transmitting element loosely mounted on said shaft and having two sets of recesses therein, the inclination of the sides of one set of recesses being reversed with respect to the inclination of the sides of the other set of recesses, an element fixed to the shaft, two independently movable sets of locking pins slidably carried by the fixed element, each set of pins having the ends shaped to correspond to the recesses of the gear for which they are adapted to engage, means for moving one set of pins into engagement with its set of recesses for the rotation of the power transmitting element in one direction, and means for moving the other set of pins into engagement with its set of recesses for the rotation of the power transmitting element in the opposite direction.

3. The combination with a driven shaft, of a sleeve fixed on the shaft, a gear loose on the shaft and provided with two sets of beveled recesses, the inclination of the sides of one set of recesses being reversed with respect to the inclination of the sides of the other set of recesses, two independent sets of locking members sliding on the sleeve, each set of locking members having end portions shaped to correspond to the recesses of the loose gear with which they are adapted to engage, an operating lever moving one set of locking members into engagement with one set of recesses for the rotation of the gear in one direction, a second operating lever for shifting the other set of locking members into engagement with the other set of recesses for the rotation of the gear in the opposite direction and means for automatically releasing the locking members from engagement with the loose gear.

4. The combination with a driven shaft, of a gear wheel loosely mounted thereon and having two sets of beveled recesses, the inclination of the sides of one set of recesses being reversed with respect to the inclination of the sides of the other set of recesses, a sleeve fixed on the shaft, independent movable sets of locking pins carried by the sleeve and engageable with the recesses formed in the gear wheel, the terminals of each set of locking pins being shaped to correspond to the recesses of the loose gear wheel with which they are designed to engage, a pair of collars surrounding the sleeve and longitudinally movable thereof, each of said collars engaging with one set of locking pins, a pivoted lever engaging each movable collar for shifting said collar on the sleeve, a collar fast with the sleeve and located between the pair of longitudinally movable collars, springs surrounding the sleeve and bearing against the longitudinally movable collars, and means for locking the levers in selected position.

In testimony whereof, I affix my signature, in presence of two witnesses.

LEVI J. HOLT.

Witnesses:
  O. P. BATES,
  C. O. CALDWELL.